(No Model.) 2 Sheets—Sheet 1.
J. R. CARPENTER.
HAY RACK.
No. 574,600. Patented Jan. 5, 1897.
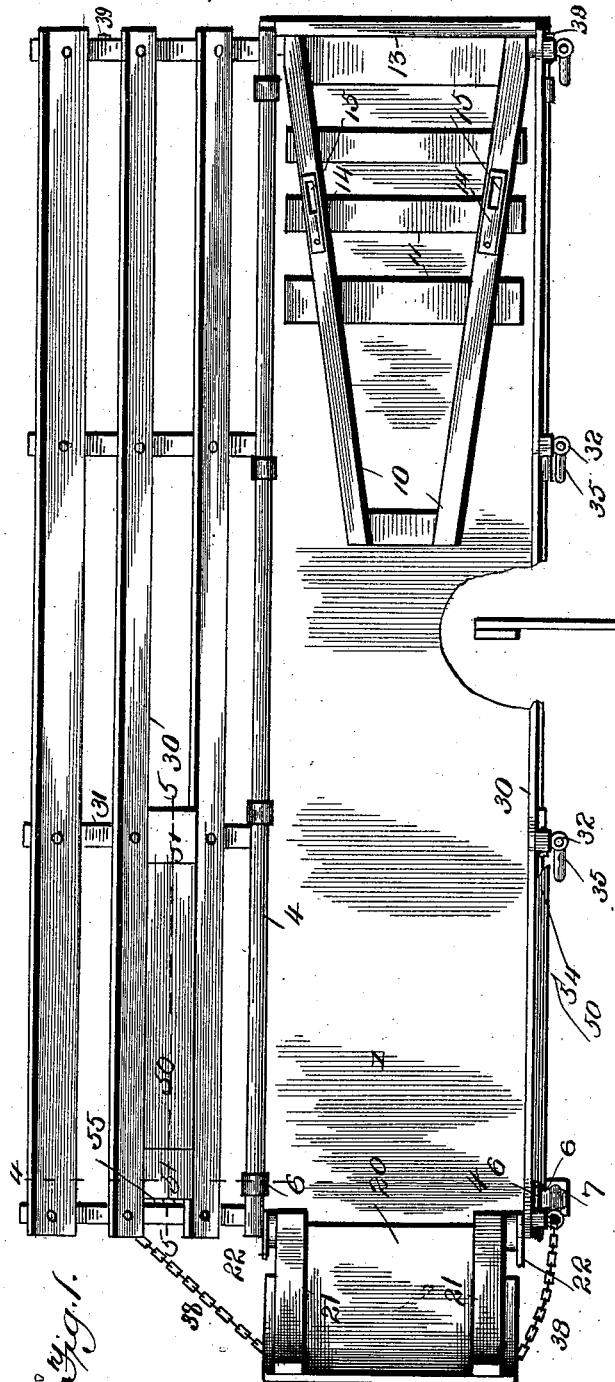
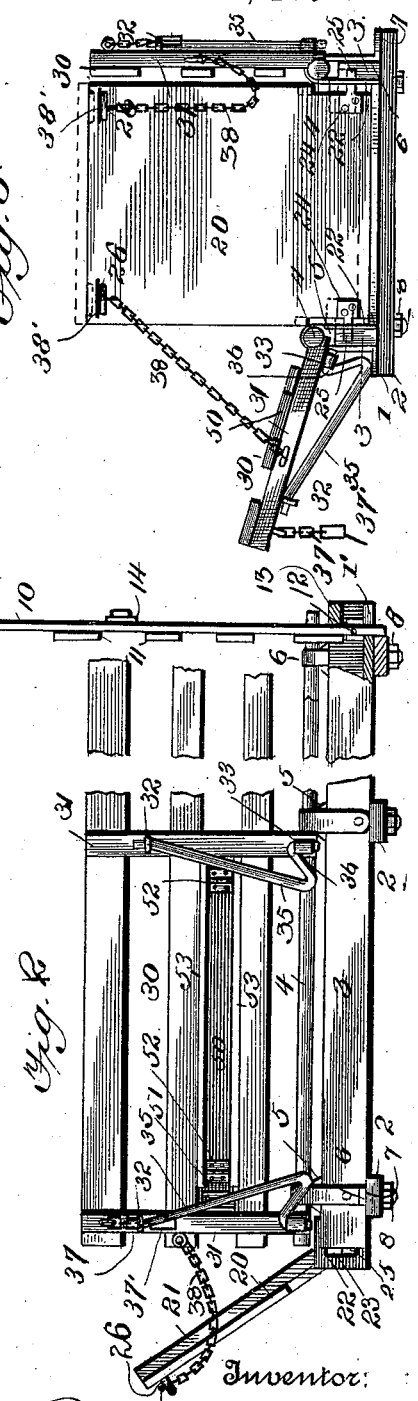
Witnesses
Inventor:
J. Ross Carpenter,
by Collamer & Co., Attorneys.

(No Model.) 2 Sheets—Sheet 2.
J. R. CARPENTER.
HAY RACK.
No. 574,600. Patented Jan. 5, 1897.
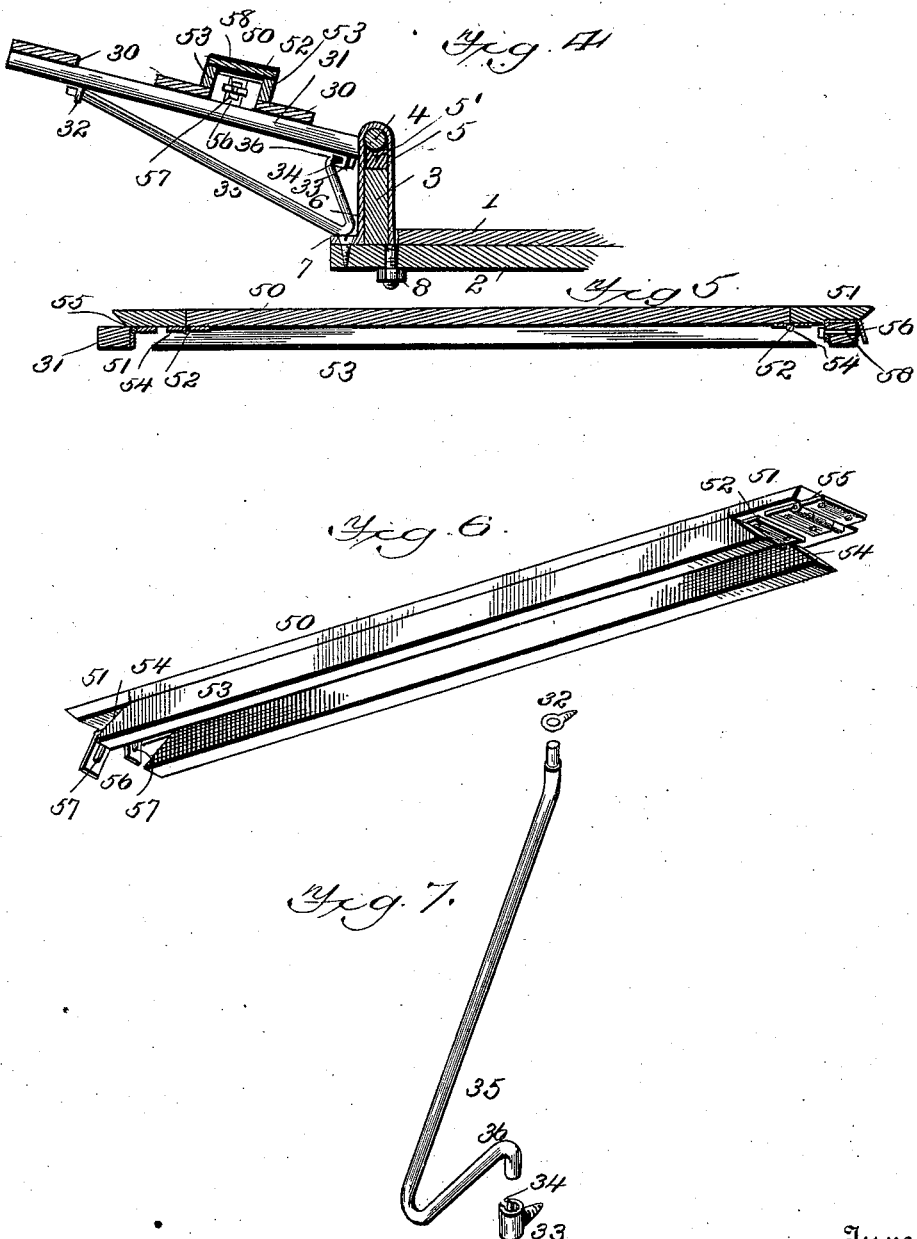

UNITED STATES PATENT OFFICE.

J ROSS CARPENTER, OF LITTLE YORK, ILLINOIS.

HAY-RACK.

SPECIFICATION forming part of Letters Patent No. 574,600, dated January 5, 1897.

Application filed May 1, 1896. Serial No. 589,901. (No model.)

*To all whom it may concern:*

Be it known that I, J ROSS CARPENTER, a citizen of the United States, and a resident of Little York, Warren county, State of Illinois, have invented certain new and useful Improvements in Hay-Racks, and my preferred manner of carrying out the invention is set forth in the following full, clear, and exact description, terminating with claims particularly specifying the novelty.

This invention relates to carriages and wagons, and more especially to that class of the latter which are known as "hay-racks;" and the object of the same is to produce an improved wagon-body so constructed that it may be folded flat and into small compass for transportation, may be opened into box shape for the purpose of carrying hogs, sheep, or the like, or may be opened still wider for the purpose of receiving hay, straw, and other similar articles.

To this end the invention consists in the hay-rack hereinafter more fully described and claimed, and as illustrated in the accompanying drawings, wherein—

Figure 1 is a plan view of this device complete, showing the front end as folded down upon the bottom, one side as upright and the other in oblique position, and the tail-board also in oblique position. Fig. 2 is a side elevation showing the upright side partly broken away at its forward end, so as to show the front end of the wagon-body as raised and in section. Fig. 3 is a rear elevation of the device with the tail-board in upright position and showing in dotted lines how it can be raised slightly for the purpose of cleaning the bottom board. Fig. 4 is a transverse section on the line 4 4 of Fig. 1, taken through the oblique side and with the wheel-guard raised. Fig. 5 is a longitudinal section on the line 5 5 of Fig. 1, showing the wheel-guard as lowered. Fig. 6 is a perspective detail of one wheel-guard removed and viewed partly from the under side. Fig. 7 is a perspective detail of one of the brackets for supporting the side.

Referring to the said drawings, the numeral 1 designates the bottom of this wagon-body or hay-rack, which bottom consists of a number of boards extending longitudinally and supported by transverse beams 2. The latter extend at their extremities beyond the edges of the bottom and beyond upright strips 3, standing at and rising slightly above said edges.

4 is a longitudinal rod supported slightly above the upper edge of each strip 3 by blocks 5 above the beams 2, which blocks are curved on their upper sides, as seen in Fig. 4, and 6 are braces of strap-iron having their feet connected, as at 7, to the outer ends of the beams 2, their bodies bolted to the outer sides of the strips 3, and thence extending upward over a groove 5', formed in the rod 4, and downward on the inside of the strip 3, and their other ends receiving nuts 8 beneath the beams 2, all as seen in Fig. 4. These braces not only hold the strips firmly upright and at the proper angle to the bottom, but also secure the whole upon the beams, and in addition their upper curved ends (with the blocks 5) form bearings on which the rods 4 may rock, as will be clear.

The front end-piece comprises two uprights 10, converging slightly and connected by cross-strips 11. The lower ends of the uprights pass down between the inner faces of the strips 3 and stand in notches 1' in the front corners of the bottom piece when this front end is raised, the latter turning as a pivot about a rod 12, extending through the strips 3.

13 is a transverse strip connecting the upper front corners of the side strips 3 and standing above the rod 12, whereby when the front end is raised so that the lower ends of the uprights 10 rest in the notches 1' the front sides of said uprights will rest against this transverse strip 13 above the pivot 12, so as to form a double brace to prevent the front end from being thrown forward. Pivoted to the uprights are strap-irons 14, having slots 15 and formed approximately like hasps, whose function will be described below.

The rear end or tail-board 20 is preferably made solid and is composed of one or more boards connected by longitudinal slips 21 on their inner faces, as seen in Fig. 1. Secured to the inner faces of the side strips 3 are plates 22, having upright slots 23 in their rearwardly-projecting portions, and 24 are other plates secured to the lower corners of the tail-board and having outwardly-projecting tongues 25, taking into said upright slots.

By this means the tail-board is permitted to swing as around a pivot, and also when in a vertical position it is permitted to be raised slightly, so that the dirt on the bottom board may be swept to the rear entirely out of the rack. When this tail-board stands upright, the lower ends of the strips rest on said bottom board, but by raising the whole slightly, so that the tongues 25 will move into the upper ends of the slots 23, the entire tail-board can be folded forward onto the bottom board 1. At the upper corners of the tail-board and on its rear face are staples 26 for a purpose to appear below.

The two sides of this rack are of the same construction, and a description of one will suffice for both. Each is composed of a number of longitudinal slats 30, connected by cross-strips 31, whose lower ends are rigidly secured to the rock-shaft or rod 4. In the outer face of each cross-strip is located near its upper end an eye 32 and near its lower end a sleeve 33, having a notch 34 in its upper edge at one side; and journaled in each eye and the sleeve below it is a bracket 35, formed of a stout metal rod and shaped about as shown in Fig. 7. The notches 34 are preferably formed in the rear sides of all the sleeves except the rearmost, and in the latter the notches are formed in the front side, and their function is to permit these brackets 35 to be turned so as to lie flat against the sides of the body and then to be dropped into place, when their projecting portions 36 will engage the notches and hold the brackets flat against the sides and out of the way. When the brackets are again raised and swung outward at right angles to the slats 30, it will be obvious that the entire side can be lowered from an upright to an oblique position and the angles at the lower ends of the brackets will rest against the side strip 3, so as to support the side in an oblique position. Connected with the rear end of each side is a chain 37, having a loop 37' at its free end, and another chain, 38, having a cross-bar 38' of T shape at its free end, and secured in the front cross-strip 31 of each side piece is a hook, button, or other device 39, adapted to engage the slot 15 in the hasp 14 on the front piece of the rack when the side is raised to upright position, as will be clear.

Referring now more particularly to Figs. 5 and 6, the numeral 50 designates the body of a wheel-guard having small end pieces 51 hinged on their under sides thereto, as at 52, and depending from the edges of the body portion 50 are strips 53, having their ends beveled on their upper sides, as at 54, whereby the end pieces, when depressed to oblique positions, may rest on these bevels, as will be clear. One end piece is hinged at its outer edge, as at 55, to the rearmost cross-strip 31, and secured to the lower face of the other end piece is a substantially U-shaped bracket 56, having slots 57 in its two projecting arms. 58 is a pin, catch, or button mounted in the cross-strip 31 next forward of the rearmost. The entire wheel-guard stands between two of the longitudinal slats 30 and in proper position to be just above the rearmost and larger wheels of the running-gear when the side pieces are thrown outward. At this time the body 50 of the wheel-guard is raised so that the end pieces 51 stand oblique, and the front arm of the bracket 56 is engaged by means of its slot with the button 58, so as to hold the wheel-guard in this raised position. At other times, and when it is desired to form a stock-pen or to fold the sides flat onto the bottom, the body 50 of the wheel-guard is raised, and its end pieces 51 are flattened out, after which the rearmost arm of the bracket 56 will be engaged with the button, so that the entire inner face of the side shall be flat. I consider this an important feature of my invention.

In use the front piece and the tail-board may be folded flat onto the bottom and then one side folded inward and its brackets turned down flat, as above described, and, finally, the other side. In this condition the improved hay-rack may be stored in small space or transported. When used as a stock-wagon for carrying hogs, sheep, and the like, the front piece and tail-board are raised to upright positions, the side pieces are also raised to upright positions and their brackets turned flat and engaged with the notches 34, the hasps 14 on the front piece are connected with the buttons 39 on the sides, the loops 37' are engaged over the staples 26, and the cross-bars 38' are then passed through the staples and turned. In this condition a complete box is formed, in which small stock can be transported with ease, the wheel-guards being at this time of course depressed so as to present a flat surface at the inner sides of the box. The tail-board, as above described, can be raised when it is desired to clean out the pen thus formed by sweeping the dirt rearwardly over the bottom board and out under the tail-board.

In order to convert the device into a hay-rack, the buttons 39 are disengaged from the hasps 14 and the front piece allowed to rest against the transverse strip 13 and in the notches 1', the brackets 35 are raised and turned outward at right angles to the sides, the cross-bars 38' are removed from the staples 26, then the loops 37' are removed, and, finally, the cross-bars are reëngaged therewith, and then the sides are let down until the brackets rest against the side strips 3, and the tail-board is let down to an angle of about forty-five degrees, where it is supported by the chains 38. The buttons 58 are disconnected from the rear arms of the brackets 56 under the wheel-guards, the end pieces 51 thereof are set up at oblique positions and the center portion raised, and, finally, the front arms of said brackets are engaged with such buttons to hold the wheel-guards in this raised position, so that they will readily clear the upper sides of the rear wheels. At this and all other times the beams 2 and strap-irons 6 firmly and rigidly hold the side strips 3 and bottom 1 in correct position, and also serve to permit the rod 4 to rock in the notches at the upper ends of the blocks 5.

All parts of this device are of the desired sizes, shapes, proportions, and materials, although preferably being made of some stout wood which is not too expensive, with the bearings and brackets of iron. The whole may be painted or not, as preferred, and can be used with any approved pattern of running-gear, as will be clearly understood.

What is claimed is—

1. In a hay-rack, the combination with the bottom board, side strips rising rigidly from the edges thereof, transverse beams beneath the board and strips extending beyond the latter, and strap-irons whose outer ends are mounted on said beams, whose bodies are attached to the strips and rise above the edges of the latter to form bearings, and whose inner ends pass through the bottom board and beams and receive nuts; of a rock-shaft journaled in the upper ends of the strap-irons above the strips, and wagon sides carried by said rock-shafts, substantially as described.

2. In a hay-wagon, the combination with the bottom board, rigid side strips rising from the edges thereof, blocks mounted on said strips and having notched upper edges, and strap-irons attached to said side strips and curving over above the blocks so as to form bearings; of a rock-shaft standing above each side strip and reduced where it rests in the blocks, and wagon sides carried by said rock-shafts, substantially as described.

3. In a hay-wagon, the combination with the bottom board having side strips rising rigidly from its edges and carrying bearings, and a folding front end and folding tail-board attached to said side strips; of rock-shafts journaled in said bearings, wagon sides carried by said rock-shafts and comprising cross-strips connected by longitudinal slats, in the outer face of each cross-strip an eye near its upper end and a sleeve near its lower end with a notch at one side, and a bracket substantially as described whose extremities are journaled in the eye and sleeve, as and for the purpose set forth.

4. In a hay-rack, the combination with the bottom board, front end, tail-board, and outwardly-swinging sides consisting of cross-strips connected by longitudinal slats; of the wheel-guard comprising a body, end pieces hinged thereto, a hinge connecting one end piece with the rearmost cross-strip, a U-shaped bracket beneath the other end piece, and a button on the cross-strip next forward of the rearmost which button is adapted to engage slots in the front or rear arm of said bracket according as the wheel-guard is raised or lowered, as and for the purpose set forth.

5. In a hay-rack, the combination with the bottom board, front end, tail-board, and outwardly-swinging sides consisting of cross-strips connected by longitudinal slats; of a wheel-guard consisting of a body, depending strips secured to its edges and having beveled ends, end pieces hinged to the extremities of the body, a hinge connecting one end piece with one cross-bar of the side, and a bracket beneath the other end piece adapted to pass inside the cross-bar next in front when the body is raised and the end pieces stand oblique, as and for the purpose set forth.

In testimony whereof I have hereunto subscribed my signature on this the 24th day of April, A. D. 1896.

J ROSS CARPENTER.

Witnesses:
GEO. H. NEWELL,
ARCH. T. SEVERS.